United States Patent [19]

Boudreau et al.

[11] 4,165,097
[45] Aug. 21, 1979

[54] STROLLER CANOPY

[75] Inventors: Robert J. Boudreau; Joel C. Cunard, both of Bedford, Pa.

[73] Assignee: Hedstrom Co., Bedford, Pa.

[21] Appl. No.: 646,331

[22] Filed: Jan. 2, 1976

[51] Int. Cl.² ............................................. B62B 11/00
[52] U.S. Cl. .................................. 280/647; 280/650; 296/102
[58] Field of Search ............... 280/647, 648, 649, 650, 280/642, 643, 644; 296/102, 107, 108; 297/184; 135/5 R

[56] References Cited

U.S. PATENT DOCUMENTS

| 2,783,053 | 2/1957 | Sheldrick | 280/643 |
|---|---|---|---|
| 2,872,203 | 2/1959 | Headstrom | 280/643 |
| 2,873,123 | 2/1959 | Eppinger | 280/643 |
| 3,248,125 | 4/1966 | Gill | 280/643 |
| 3,550,998 | 12/1970 | Boudreau | 280/650 |
| 3,873,117 | 3/1975 | Perego | 280/650 |
| 3,917,302 | 11/1975 | Gebhard | 280/644 |

Primary Examiner—Robert R. Song
Attorney, Agent, or Firm—Cesari and McKenna

[57] ABSTRACT

A canopy for a bi-directionally folding stroller has a pair of side frame members whose corresponding first ends are pivotally connected to the stroller pusher handles and whose opposite ends are normally held apart by an articulated frame member. Flexible sheet material is stretched between the side frame members and retained there by lateral fingers projecting from the side frame members and engaging in pockets in the sheet material. Triangular flaps of sheet material extend beyond the side frame members. These can be connected together at the underside of the canopy or to points adjacent the pusher handles to partially enclose the sides of the stroller.

6 Claims, 4 Drawing Figures

U.S. Patent  Aug. 21, 1979  4,165,097
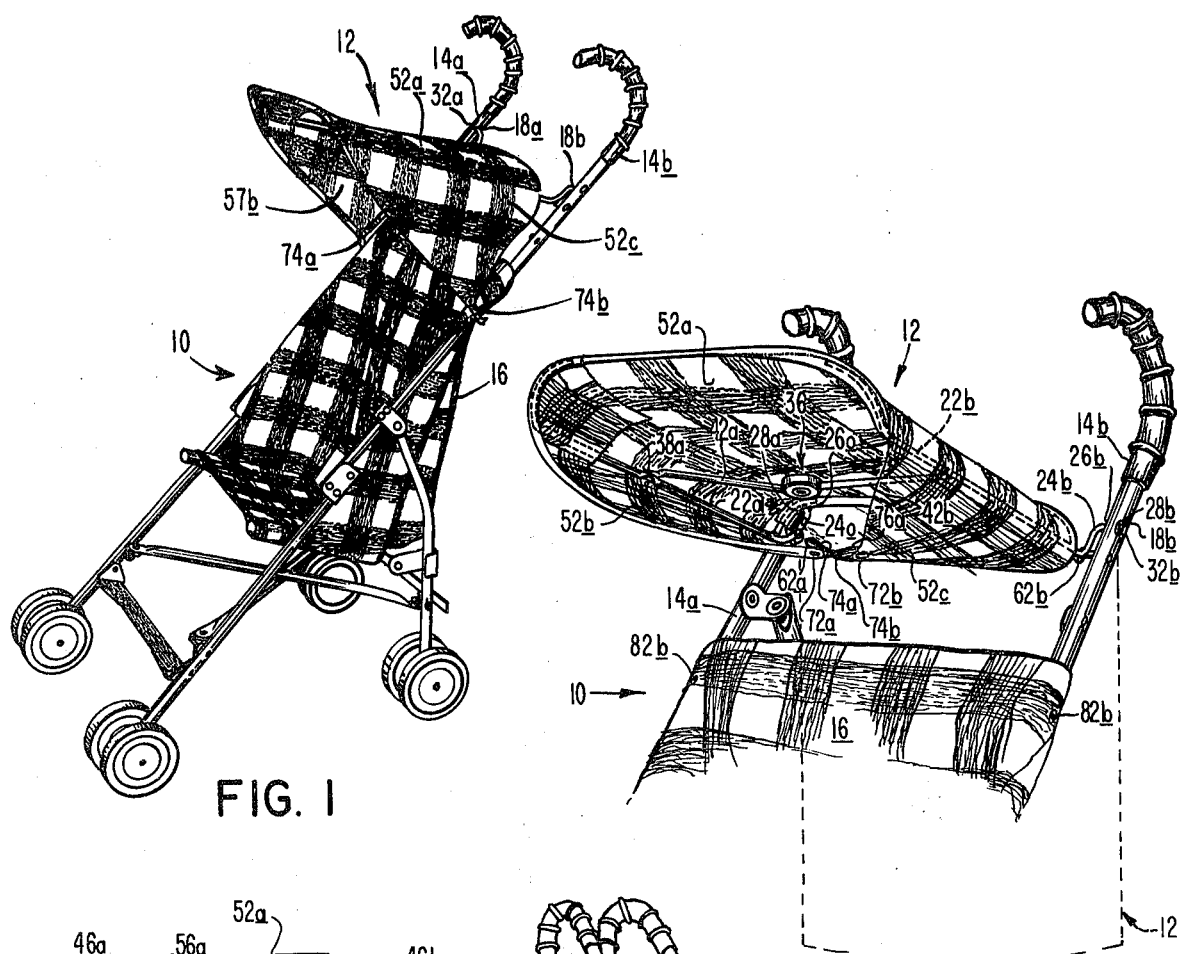
FIG. 1
FIG. 2
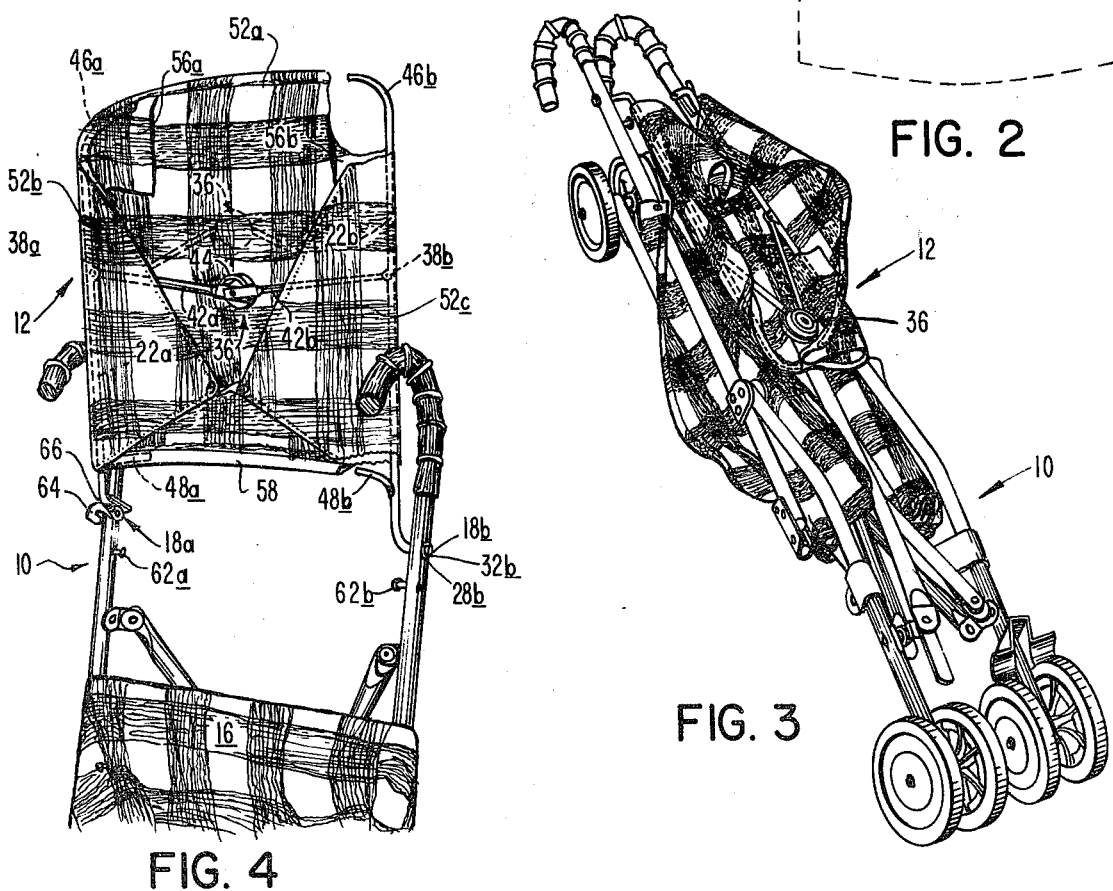
FIG. 4
FIG. 3

4,165,097

STROLLER CANOPY

BACKGROUND OF THE INVENTION

This invention relates to an improved stroller canopy. It relates more particularly to a canopy especially suited for use with a bi-directionally folding stroller.

Bi-directionally folding strollers have become quite popular in recent years because they fold compactly for easy storage in a closet or car. A folding stroller of this general type is disclosed in U.S. Pat. No. 3,390,893. As originally conceived, that stroller had no canopy. Since its introduction, however, various canopy constructions have been proposed to date, one such foldable canopy as shown in U.S. Pat. No. 3,917,302.

In addition to being foldable along with the rest of the stroller so that the entire package reposes in stick form, a suitable canopy should be relatively inexpensive to make. Also the canopy fabric must be removable from the canopy frame so that the material can be cleaned and replaced. Further, the canopy should offer the stroller occupant different degrees of sun and wind protection depending upon the circumstances without spoiling the appearance of the stroller. No prior canopy of this folding type including the one in the above patent provides all of these features.

SUMMARY OF THE INVENTION

A prime object of the invention is to provide a canopy of this general type which folds into a compact package along with the stroller.

A further object of the invention is to provide a stroller canopy which is readily removable from the canopy frame in the event it has to be cleaned or repaired.

Yet another object of the invention is to provide a stroller canopy of this general type which offers the stroller occupant different degrees of protection.

Other objects will in part be obvious and will in part appear hereinafter.

The invention accordingly comprises the features of construction, combination of elements and arrangement of parts which will be exemplified in the following detailed description, and the scope of the invention will be indicated in the claims.

In general, the present canopy comprises a pair of side frame members whose corresponding first ends are pivotally connected to the stroller pusher handles in the usual way. The opposite ends of the side frame member are held in spaced-apart relation by an articulated frame member. A sheet of fabric material is stretched between the two side frame members being retained thereon by fingers projecting laterally from the ends of the side frame members and engaging in pockets provided in the fabric.

The canopy fabric material includes integral triangular flaps extending laterally beyond the side frame members. The apexes of these flaps can either be connected to one another at the underside of the canopy in the event only overhead protection for the occupant is desired. Alternatively, these flaps can be connected to points adjacent to the pusher handles appreciably below the canopy to partially enclose the sides of the stroller.

When the stroller is folded, the articulated member folds, allowing the canopy side frame members to come together so that the canopy forms a compact package along with the rest of the stroller. In the event the canopy fabric material needs to be cleaned or replaced, removal of the side frame fingers from the fabric pockets permits the material to be slid from the frame members with a minimum of effort.

Thus the subject canopy construction has a minimum number of parts and its fabric material is easily installed and replaced. Consequently the canopy is relatively inexpensive to make and maintain and does not increase appreciably the overall cost of the stroller.

DESCRIPTION OF THE DRAWING

For a fuller understanding of the nature and objects of the invention, reference should be had to the following detailed description, taken in connection with the accompanying drawing, in which:

FIG. 1 is a perspective view of a stroller having a canopy made in accordance with this invention;

FIG. 2 is a fragmentary perspective view on a larger scale showing the canopy in greater detail;

FIG. 3 is a perspective view showing the canopy in its folded condition, and

FIG. 4 is a fragmentary perspective view on a larger scale showing the canopy in still further detail.

DESCRIPTION OF THE PREFERRED EMBODIMENT

Referring now to FIG. 1 of the drawings, a bi-directionally folding stroller indicated generally at 10 has a canopy shown generally at 12 made in accordance with this invention. Stroller 10 is of a conventional type described in detail in the aforesaid patents. It includes a pair of pusher handles 14a and 14b between which is stretched a stroller fabric backrest 16.

Canopy 12 is pivotally connected at 18a and 18b to pusher handles 14a and 14b respectively. Accordingly the canopy can be swung from a generally horizontal position illustrated in FIGS. 1 and 2 to a substantially vertical position shown in dotted lines in FIG. 2 where it reposes behind and below the pusher handles 14a and 14b. Also, when the stroller 10 is collapsed as illustrated in FIG. 3, the canopy 12 folds down flush against the pusher handles as illustrated in that figure. When in use the canopy 12 can be used either to give just overhead protection to the stroller occupant as indicated in the FIG. 2. Alternatively, the canopy can be adjusted as illustrated in FIG. 1 to provide a measure of protection for the occupant from the elements directed against the sides of his head.

Adjustment of the canopy 12 between its various operative positions will be best understood with reference to FIGS. 2 and 4. The canopy includes a pair of identical side frame members 22a and 22b made of stiff wire or other suitable material. As best seen in FIG. 2, the ends of the wires adjacent to the corresponding pusher handles 14a and 14b have upwardly bent segments 24a and 24b respectively, and laterally outwardly bent segments 26a and 26b respectively. The outwardly bent segments 26a and 26b are received in lateral openings 28a and 28b in pusher handles 14a and 14b respectively. Conventional friction nuts 32a and 32b engage over the ends of those segments projecting from the pusher handles. These connections form the pivots 18a and 18b described in connection with FIG. 1.

As best seen in FIG. 4, the ends of the side frame members 22a and 22b opposite pivots 18 are normally held apart by an articulated frame member indicated generally at 36. The opposite ends of member 36 are connected by pivots 38a and 38b to the side frame members 22a and 22b respectively. Actually member 36 is composed of two similar arms 42a and 42b connected together by a pivot 44. The pivot 44 is arranged so that the frame member 36 can only break in one direction as indicated by its partially folded dotted line position 36 in FIG. 4. In this it comprises a cup 45 having half of its rim cut away connected to the ends of arms 42a and 42b by a pin 47. The ends of the remaining portion of the rim form abutments which prevent rearward movement of the arms about pin 47 beyond their solid line positions shown in FIG. 4.

A pair of upwardly curved laterally extending fingers 46a and 48a project from the opposite ends of frame member 22a toward frame member 22b. A similar pair of fingers 46b and 48b project from the opposite ends of frame member 22b toward member 22a. These fingers provide support for canopy fabric material 52 stretched between the two side frame members 22a and 22b. This material includes a generally rectangular section 52a extending between the two side frame members and a pair of integral triangular flaps 52b and 52c at opposite sides of section 52a and which drape around the side frame members 22a and 22b respectively. A pair of rearwardly opening pockets 56a and 56b are formed in the underside of fabric section 52a at the front corners thereof. Pockets 56a and 56b are sized to receive the laterally extending fingers 46a and 46b projecting from the side frame members 22a and 22b respectively. Also the rear edge of section 52a is hemmed to form an elongated lateral pocket 58 extending all across that section. The laterally extending fingers 48a and 48b project into the opposite ends of that pocket 58.

When the articulated member 36 is in its fully extended, solid line position in FIG. 4, the side frame members 22a and 22b are spread apart to make the fabric section 52a quite taut from side to side. On the other hand, the front and rear edges of that section are held in place by the laterally extending fingers 46 and 48. Thus a two-way stretch is maintained on the fabric.

In use, the canopy 12 is supported in a generally horizontal position as shown in FIGS. 1 and 2. It is held in that position by a pair of laterally extending studs 62a and 62b located on the pusher handles 14a and 14b just below pivots 18a and 18b respectively. The studs project toward one another and engage the canopy side frame segments 24a and 24b when the canopy has assumed its generally horizontal position.

A generally L-shaped lock 64 (FIG. 4) is held by a pivot 66 to segment 24a. When the canopy is in its normal position, the lock 64 engages over stud 62a to prevent the canopy from being blown upwards by the wind. The canopy is released simply by lifting the lock 64 from stud 62a. This allows the canopy 12 to be swung backwards around its pivots 18a and 18b (FIG. 1) so that it hangs vertically behind the pusher handles 14a and 14b as shown in the dotted lines in FIG. 2.

When in use, the canopy can have its fabric side flaps 52b and 52c either folded under the canopy as in FIG. 2 so that the canopy simply affords overhead protection. Alternatively, those flaps can be allowed to drape vertically as illustrated in FIG. 1 to provide additional protection at the sides of the stroller. A male snap fastener element 72a connects one end of an elastic strap 74a to the corner or apex of fabric section 52a. That strap 74a also carries a female snap fastener element 76a. A similar strap 74b and snap fastener elements 72b and 76b are connected to the corner or apex of the other flap 52b.

When the canopy is used as in FIG. 2 with its flaps secured together, the mating snap fastener elements are connected together. On the other hand, when the canopy is used as in FIG. 1, the straps 74a and 74b are pulled down around the pusher handles 14a and 14b where the fastener elements 76a and 76b are connected to male snap fastener elements 82a and 82b secured to opposite sides of the fabric backrest 16 and which are best seen in FIG. 2.

When the canopy is in use, its fabric material 52 completely encloses the underlying frame members. On the other hand, the frame members support the fabric material so that it has the appearance of a bonnet and conforms to and complements the rake of the stroller pusher handles. Thus the canopy gives the stroller a particularly pleasing overall appearance whether flaps 52b and 52c are in their raised position as in FIG. 2 or in their lowered position as in FIG. 1.

When it is desired to fold the stroller, the latch 64 is released and the canopy 12 swung around behind the pusher handles as shown in dotted lines in FIG. 2. Then the stroller is folded in the usual way as in FIG. 3. As the pusher handles draw together, the articulated member 36 automatically folds as indicated in solid lines in FIG. 3 so that the canopy is no wider than the nested-together pusher handles. Of course the canopy fabric material 52, being flexible, automatically folds as needed. Consequently the stroller with its canopy forms a very compact package as seen in FIG. 3.

It will be seen from the foregoing, then, that the canopy construction described herein is relatively simple to make. Still the canopy can be folded as the stroller is folded, while permitting the canopy fabric material to be removed easily in the event that it has to be cleaned, repaired or replaced. Still further, the canopy can be used either with its side flaps up or down as needed to suit the particular occasion. Yet with all of these advantages, the canopy is still relatively inexpensive to make and, therefore, should not increase appreciably the overall cost of the stroller.

It will thus be seen that the objects set forth above, among those made apparent from the preceding description, are efficiently attained and since certain changes may be made in the above construction without departing from the scope of the invention, it is intended that all matter contained in the above description are shown in the accompanying drawing shall be interpreted as illustrative and not in a limiting sense.

It is also to be understood that the following claims are intended to cover all of the generic and specific features the invention herein described.

I claim:

1. In a bi-directionally folding stroller having spaced apart, foldable pusher handles, a canopy comprising
    A. a pair of spaced-apart side frame members having corresponding first ends pivotally connected to the pusher handles;
    B. means near the unpivoted ends of the frame members for holding said members apart;
    C. a sheet of flexible fabric material extending between said side frame members, and
    D. means for removably securing the fabric material to the side frame members at points near the opposite ends of said side frame members to maintain the fabric material under a two-way stretched condition, wherein the securing means comprise (1) fingers extending laterally from opposite ends of said side frame members toward one another, and (2) means defining pockets in said fabric material adjacent the opposite ends of said side frame members and for removably receiving said fingers.

2. The stroller defined in claim 1 and further including retaining means projecting laterally from at least one of said pusher handles adjacent to the pivotal connection to that handle for engaging the associated frame member when the canopy is in a generally horizontal plane.

3. The stroller defined in claim 2 and further including a latch pivotally connected to said side frame member, said latch engaging said retaining means when said side frame member is engaged by said retaining means.

4. In a bi-directionally folding stroller having spaced apart, foldable pusher handles, a canopy comprising, A. a pair of spaced-apart side frame members having corresponding first ends pivotally connected to the pusher handles;

B. means near the unpivoted ends of the frame members for holding said members apart;

C. a sheet of flexible fabric material extending between said side frame members;

D. a pair of generally triangular fabric flaps integral with the opposite sides of said fabric material, said flaps being draped around said side frame members, and E. means at the free corner of each of said flaps for removably securing said corner to the corresponding corner of the opposite flap.

5. The stroller defined in claim 4 and further including means at opposite sides of said stroller adjacent to said pusher handles for co-acting with the securing means on said flaps so that said flaps can be retained in a generally vertical condition at opposite sides of the stroller.

6. The stroller defined in claim 5 wherein the securing means comprise

A. elastic straps, and

B. snap fastener elements secured to said straps.

* * * * *